Jan. 22, 1963 S. P. KINNEY 3,074,560
POSITIVE PRESSURE BACKWASH STRAINER
Filed Jan. 7, 1959 2 Sheets-Sheet 2

INVENTOR.
SELWYNE P. KINNEY.
BY
ATTORNEYS.

United States Patent Office 3,074,560
Patented Jan. 22, 1963

3,074,560
POSITIVE PRESSURE BACKWASH STRAINER
Selwyne P. Kinney, Pittsburgh, Pa., assignor to S. P. Kinney Engineers, Inc., Carnegie, Pa., a corporation of Pennsylvania
Filed Jan. 7, 1959, Ser. No. 785,471
2 Claims. (Cl. 210—330)

This invention is for an industrial strainer of the type having a rotating drum carrying strainer elements through which water or other liquids to be strained must pass, the rotation of the drum moving the strainer elements past a backwash shoe by means of which solids lodged against the strainer elements may be flushed away by a reverse flow of liquids through the strainer elements. More particularly this invention is for a strainer in which the backwashing liquid is supplied from an external source and at a pressure above the pressure of liquid in the strainer.

By way of explanation it may be pointed out that industrial strainers of the type to which this invention pertains generally have a drum in the form of an inverted truncated cone concentrically positioned inside a case so constructed that water to be strained introduced at the bottom of the casing surrounds the exterior of the casing. The drum is provided with many holes in which are set straining elements or media selected according to the purpose for which the strainer is used. The liquid to be strained flows through the straining elements and out the lower end of the drum through an outlet duct in the case to a discharge connection for carrying away the strained liquid. At one point on the inside of the casing there is an internal rib on the face of which is a vertical slot, the face of this rib or shoe bearing against the periphery of the drum. As usually constructed, a very small amount of the total liquid flowing through the interior of the drum back flows through the strainers into the vertical slot in the backwash shoe and is carried away in a waste pipe. In flowing in the reverse direction through the strainers, this back flow of water is supposed to dislodge solids impacted against the outer faces of the straining elements and flush them into the waste pipe.

Such an arrangement, while widely used, requires that the pressure inside the drum of the strainer be greater than atmospheric pressure existing in the waste pipe into which the water backflushes. This requires that the pump which forces the water through the strainer be on the intake side of the strainer, operating on the unstrained water. If it were on the discharge side of the strainer, it would draw water from the interior of the drum so that there would be no effective pressure to backwash the strainers. Also, some contaminated water carries very fine material, such as lint or paper pulp that mats itself on the strainers and which requires pressures to dislodge it greater than that generated by the pump which forces water through the strainer.

This has led to the use of a backwash shoe on the inside of the strainer drum which may be supplied with backwashing water from an external source at higher pressure than that inside the drum. Such a construction is shown in my copending application Serial No. 624,056, filed November 23, 1956 and now Patent No. 2,918,172 issued December 22, 1959. However, all such positive pressure backwashing shoes have required the use of cylindrical strainer drums, whereas an inverted conical drum provides substantially more filtering area in a unit of given height and diameter than does a cylinder. A strainer with a cylindrical drum and positive pressure backwash is disclosed in application of Selwyne P. Kinney, et al., Serial No. 637,685, filed February 1, 1957 now Patent No. 2,956,683 issued October 18, 1960. In such a construction the internal shoe can be moved radially for assembly of the strainer and to take up for any play that develops between the shoe and the inner wall of the drum, but such an arrangement is difficult to adjust and keep in adjustment with a conical drum.

The primary object of the present invention is to provide a rotary drum strainer with a drum of inverted conical shape, with a positive pressure backwash shoe inside the drum and provide a simple adjustment whereby the drum and outside shoe and the drum and inside shoe can be adjusted for wear or for other purposes, as in the assembly or replacement of a drum. A further object of this invention is to provide such adjustment entirely from the exterior of the strainer casing.

These and other objects and advantages are secured from my invention which may be more fully understood by reference to the accompanying drawings, in which.

Figure 1:
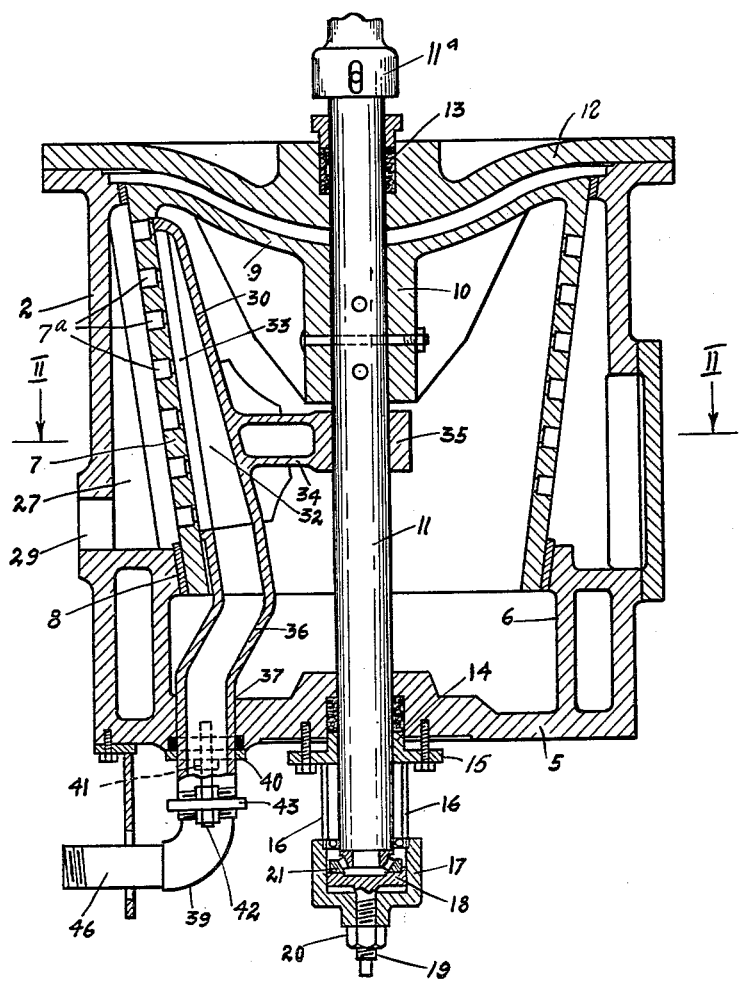
FIG. 1 is a longitudinal section through a strainer embodying my invention.

In the drawings, the strainer is preferably of the general construction shown in the copending application of Kinney, et al., Serial No. 637,685, filed February 1, 1957, now Patent No. 2,956,683, wherein the casing 2 has an inlet connection 3, which, as shown in said application, changes in section from a circular outer end to a vertically elongated ellipse at its inner end, and an outlet connection 4 that is a horizontally-elongated oval at its inner end, and circular at its outer end. These connections are diametrically opposite and at right angles to the plane of the section in FIG. 1 so that they are seen only in FIG. 2. The casing has a bottom 5 with an interior vertical wall 6 extending part way up the interior of the casing. The strainer drum is designated 7 and has its lower end rotatably engaged with a bearing ring 8 on the wall 6. Its periphery is provided with holes 7a therethrough in which a strainer medium is placed in the usual manner. The drum has a closed top 9, and it is carried by a hub 10 on a vertical shaft 11 that is driven by a motor (not shown), which is above the removable cover 12 that is bolted to the top of the casing in the usual manner, the bolts not being shown. The shaft 11 passes through a packing gland 13 at the top of the cover and through a gland 14 on the outside of the bottom. The adjusting sleeve 15 of the gland 14 is bolted, as indicated, to the bottom of the casing. It is here shown as a casting with integral spaced hangers 16 depending therefrom that support a cup 17 with which they are integral or otherwise attached. This cup has in it a vertically adjustable thrust bearing assembly which comprises a supporting plate 18 with a threaded stem 19 that is screwed through the bottom of the cup and has a terminal at its lower end to which a wrench may be applied for turning the stem to raise or lower the plate, while a lock nut 20 on the stem restrains it from free rotation. There is a conventional cone roller bearing 21 on the plate about the lower end of the shaft for accepting the thrust of the shaft. By raising or lowering plate 18, the shaft 11 and the strainer drum 7 may be raised or lowered.

As is usual in this type of strainer, the drum has many holes through its periphery into each of which is secured a removable strainer element, these elements, for clarity of illustration, not being shown, but which may be of the general form shown, for example, in my Patent No. 2,371,760, dated March 20, 1945, and particularly FIG. 8 thereof.

Figure 2:
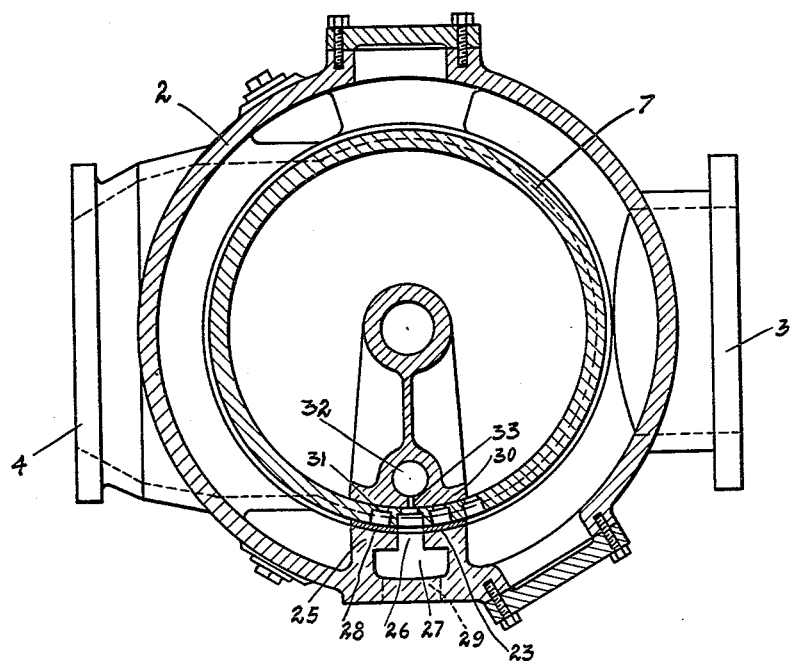
FIG. 2 is a transverse horizontal section in the plane of line II—II of FIG. 1.
Figure 3:
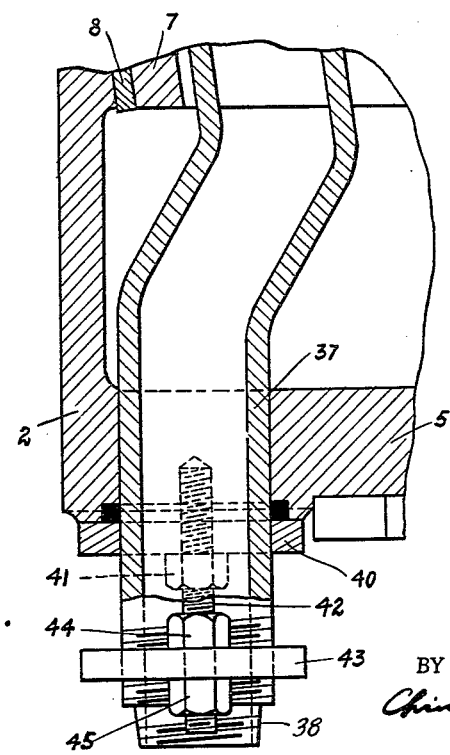
FIG. 3 is a fragmentary vertical section on a larger scale of the adjustment for the internal backwashing shoe.

On the inner wall of the casing 2 there is a vertical rib 25 coextensive in height with the drum, and which is tapered in radial thickness from a maximum thickness at the bottom of the drum to its narowest thickness at the top. The slope of its tapered vertical face is the same as the slope of the inverted conical drum, as best shown in FIG. 2, this rib 25 has a central vertical slot 26 leading into a chamber 27. At the outer face of the rib at each side of the slot there is secured a vertical bearing strip 28 of bronze or other bearing metal, which bears against the surface of the cone. The width of the rib is greater than the distance across any three horizontally-aligned strainer openings, as is usual in strainers of this type. A waste pipe 29 leads from the lower end of the chamber 27. This rib comprises the outer backwash shoe such as is common in rotary drum strainers.

According to the present invention there is a positive pressure backwash shoe inside the drum confronting the backwash shoe in the outer surface of the drum. It comprises a vertical shoe member 30 having a convex surface 31 (see FIG. 2) bearing against the interior of the drum, its surface being sloped vertically to conform to the slope of the interior of the drum. It has a vertical water passage 32 back of the surface 31, and there is a narrow vertical slit 33 leading from the center of the surface 31 to the water passage, this slit being centered opposite the slot 26 in the outer shoe. The inner shoe is of a vertical height such as to be coextensive with that part of the surface of the drum which has strainers therein so that water under pressure supplied to the passage 32 will flow at high velocity through slit 33 through the screen elements that progressively move past it, the backwashing water so supplied entering the outer shoe and being carried away through the waste pipe. The backwashing is performed simultaneously with the filtering.

The inner shoe is held against the inner face of the strainer drum by a radial bracing structure 34 terminating in a hub or sleeve 35 slidable on the shaft 11. At the bottom of the shoe is an outwardly offset tubular extension 36 with a tubular depending portion 37 that passes through the bottom of the casing 2 and which terminates in a nipple 38 to which a water inlet fitting 39, here shown as an elbow, is screwed.

The depending portion 37 passes through a packing in the bottom of the casing having a plate 40 for retaining the packing. The plate 40, which encircles the extension 37, is held against the packing by nuts 41 on threaded studs 42 screwed into the bottom of the casing. These studs also pass through openings in a collar 43 screwed onto the depending portion 37, and, by adjustment of nuts 44 and 45 on the studs 40, the collar and the whole inner shoe assembly may be raised and lowered. While no radial adjustment of the inner shoe is provided, the inner shoe may be kept in sliding contact with the inner face of the drum by such vertical adjustment and by vertical adjustment of the drum provided by the adjustable thrust bearing. This, of course, is because of the parallel inclined surfaces on the outer shoe, the exterior of the drum, the interior of the drum, and the face of the inner shoe. If the drum is lowered in the casing it bears more tightly against both the outer and inner shoe. If it is then too tight against the inner shoe, the inner shoe may be raised. If the inner shoe bears too loosely against the inner face of the drum, the inner shoe may be lowered without disturbing the relation between the drum and the outer shoe.

The arrangement is of especial advantage since all adjustments are made without opening up the strainer or taking it out of service, although there are removable manhole covers on the casing 2 to afford access to the straining media. The extension 37 of the shoe which passes through the bottom of the casing holds the shoe against rotation about the shaft 11. The range of vertical adjustment required is very slight, and the water supply pipe 44 to the elbow 39 will flex adequately to permit the required adjustment.

In use, backflushing water supplied from a source of pressure which may be well above that on the interior of the strainer is supplied through pipe 46, enters the inner shoe, and washes back through the straining media to dislodge dirt or other material that collects against them when the water being strained flows through the strainers from the exterior to the interior of the drum. The strainer may therefore be used in applications where the strainer is on the suction side of a pump, and for use in certain industries, as for example the paper industry, where water carrying fibers that mat firmly against the screens must be dislodged by pressures greater than that of the liquid passing through the strainer.

Where the shaft 11 is driven by a motor above the casing, there may be a splined coupling or similar arrangement on the upper end of shaft 11 as indicated at 11a to allow for slight vertical adjustment. If the drive is constructed as shown in my aforesaid patent, the rack on the periphery of the drum may slide relatively to the pinion sufficient to allow the necessary range of adjustment.

I claim:

1. A rotary drum strainer comprising an enclosing casing, a drum of inverted truncated conical shape in the casing having strainer openings in the periphery thereof and strainer elements in said openings, the drum being closed at the top and having an open bottom, means in the bottom of the casing engaging the lower end of the drum providing a seal, means for supplying liquid to be strained to the casing around the exterior of the drum, an outlet for carrying away strained liquid from the lower end of the drum, a shaft on which the drum is carried, said shaft passing through the top and bottom of the casing, a backwashing shoe on the interior of the casing having an inclined face parallel with the outer face of the drum which it confronts and against which it bears, a positive pressure backwashing shoe inside the drum bearing against the inner wall of the drum in confronting position to the shoe on the casing and having its face inclined parallel to the inner wall of the drum and the face of the shoe in the casing, a thrust bearing at the outside of the bottom of the casing for supporting said shaft on which the drum is mounted, said positive pressure shoe having a pipe-like extension at its lower end extending out the open bottom of the drum and through the bottom of the casing eccentrically to the shaft, cooperating means at the exterior of the bottom of the casing and on said extension for adjustably raising or lowering the positive pressure shoe and supporting it against radial movement, and a pipe connection for supplying liquid under pressure to the positive pressure shoe from a source of supply, said first backwashing shoe having a discharge opening for the outflow of backwash liquid therefrom, said positive pressure shoe having integral bracing thereon slidably engaging the drum shaft for holding the shoe against the interior of the drum and confining the same against radial movement relative to the drum.

2. A rotary drum strainer comprising a strainer carrying drum of truncated cone shape mounted on a central shaft, a shoe having an inclined face the inclination of which is parallel with the inner face of the drum and which is transversely convexed to conform to the curvature of the interior wall of the drum, said shoe having radially-extending rigid bracing terminating in a hub slidably engaged for vertical movement on the drum shaft of said strainer for holding the shoe against radial movement by laterally bracing the shoe face intimately against the drum inner face, the shoe having a downwardly-extending pipe-like conduit at its lower end adapted to pass through the bottom of said strainer, the lower end of the extension having a removable adjusting plate thereon by which the shoe may be secured to the casing at the exterior of the casing and by means of which the shoe may be adjusted vertically with the shoe being guided in its vertical movement by the sliding engagement of the hub with the drum shaft whereby the shoe is restrained against radial movement and tolerance between the shoe face and the inner face of the drum is selectively varied.

References Cited in the file of this patent
UNITED STATES PATENTS

| | | |
|---|---|---|
| 1,950,466 | Wille et al. | Mar. 13, 1934 |
| 1,968,741 | Burrell | July 31, 1934 |
| 2,371,760 | Kinney | Mar. 20, 1945 |